United States Patent
Henn et al.

(10) Patent No.: US 10,487,012 B2
(45) Date of Patent: Nov. 26, 2019

(54) PAVERS AND BLOCK COMPOSITE MATERIALS AND METHODS OF PREPARATION THEREOF

(71) Applicant: Solidia Technologies, Inc., Piscataway, NJ (US)

(72) Inventors: Francis Henn, Washington, NJ (US); Deepak Ravikumar, Piscataway, NJ (US); John P. Kuppler, Greenbrook, NJ (US); Kenneth Smith, Flemington, NJ (US); Oguzhan Oflaz, Jersey City, NJ (US); Dawid Zambrzycki, South River, NJ (US); Vahit Atakan, West Windsor, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 0 days.

(21) Appl. No.: 14/207,920

(22) Filed: Mar. 13, 2014

(65) Prior Publication Data
US 2014/0314990 A1    Oct. 23, 2014

Related U.S. Application Data

(60) Provisional application No. 61/780,592, filed on Mar. 13, 2013.

(51) Int. Cl.
| | |
|---|---|
| *C04B 35/22* | (2006.01) |
| *C04B 14/04* | (2006.01) |
| *C04B 28/18* | (2006.01) |

(52) U.S. Cl.
CPC ............ *C04B 35/22* (2013.01); *C04B 14/043* (2013.01); *C04B 28/188* (2013.01); *Y02P 40/18* (2015.11); *Y10T 428/24355* (2015.01)

(58) Field of Classification Search
CPC ..... C04B 35/22; C04B 14/043; C04B 28/188; E04C 1/00; Y10T 428/24355;
(Continued)

(56) References Cited

U.S. PATENT DOCUMENTS

| | | | |
|---|---|---|---|
| 2011/0067600 A1* | 3/2011 | Constantz et al. | 106/640 |
| 2011/0067603 A1* | 3/2011 | Constantz et al. | 106/739 |

(Continued)

FOREIGN PATENT DOCUMENTS

| | | | |
|---|---|---|---|
| WO | WO 2012079173 A1 * | 6/2012 | |
| WO | 2012/122031 A2 | 9/2012 | |

*Primary Examiner* — Nathan L Van Sell
(74) *Attorney, Agent, or Firm* — Dentons US LLP

(57) ABSTRACT

The invention provides novel paving stones and construction block composite materials and methods for preparation thereof. The paving stones and construction block composite materials can be readily produced from widely available, low cost precursor materials by a production process that involves compacting in a mold that is suitable for large-scale production. The precursor materials include calcium silicate, for example, wollastonite, and particulate filler materials which can comprise silicon dioxide-rich materials. Additives can include calcium carbonate-rich and magnesium carbonate-rich materials. Various additives can be used to fine-tune the physical appearance and mechanical properties of the composite material, such as colorants such as particles of colored materials, such as, and pigments (e.g., black iron oxide, cobalt oxide and chromium oxide). These paving stones and construction block composite materials exhibit visual patterns similar to stone as well as display compressive strength and water absorption equal to or better than that of stone.

22 Claims, 4 Drawing Sheets

(58) Field of Classification Search
CPC ....... Y10T 428/24372; Y10T 428/2438; Y10T
428/24388; Y10T 428/24397; Y10T
428/24405; Y10T 428/24413; Y10T
428/24421; Y10T 428/2443; Y02P 40/18
USPC .................. 428/141–150; 501/143, 153, 154
See application file for complete search history.

(56) References Cited

U.S. PATENT DOCUMENTS

| | | | |
|---|---|---|---|
| 2011/0067605 A1* | 3/2011 | Constantz et al. | 106/817 |
| 2011/0165400 A1* | 7/2011 | Quaghebeur | C04B 28/10 |
| | | | 428/220 |
| 2011/0172075 A1* | 7/2011 | Grasso et al. | 501/11 |
| 2011/0182799 A1* | 7/2011 | Riman et al. | 423/396 |
| 2011/0203489 A1* | 8/2011 | Constantz et al. | 106/817 |
| 2011/0271876 A1* | 11/2011 | Alter et al. | 106/707 |
| 2012/0073474 A1* | 3/2012 | Constantz et al. | 106/738 |
| 2012/0082839 A1* | 4/2012 | Ha et al. | 428/221 |
| 2012/0145047 A1* | 6/2012 | Constantz et al. | 106/738 |

* cited by examiner

PAVERS AND BLOCK COMPOSITE MATERIALS AND METHODS OF PREPARATION THEREOF

CROSS-REFERENCE TO RELATED APPLICATIONS

This application claims priority to and the benefit of U.S. provisional patent application Ser. No. 61/780,592, filed Mar. 13, 2013, which application is incorporated herein by reference in its entirety.

FIELD OF THE INVENTION

The invention generally relates to novel composite materials that can be used as paving stones or as construction blocks. More particularly, the invention relates to synthetic paving stones and construction block materials and their preparation from a variety of low-cost raw materials including water and carbon dioxide. These composite materials are suitable for a variety of uses in construction, infrastructure, art and decoration.

BACKGROUND OF THE INVENTION

Humans have known and used stone as a building material since ancient times. Its unique aesthetic and physical qualities have made stone a desirable material in building and construction as well as in decorative art and sculpture.

Pavers are concrete blocks that are made by using a casting process, a pressing process, a compacting process, or a combination of vibration and pressing. Pavers are generally laid in interlocking pattern. These pavers are also sometime referred as paving stones. These pavers can be removed when damaged during service life with a new one reducing any service interruption. Interlocking pavers could be designed to have a gap between the patterns that provides for draining of water to sub layers.

ASTM C 936 provides criteria that concrete pavers need to satisfy but is not limited to the following: an average compressive strength of 8,000 psi; an average water absorption no greater than 5%; and resistance to at least 50 freeze-thaw cycles with average material loss not exceeding 1%. In addition to the ASTM requirements, one may also wish that the payers satisfy additional requirements, including reduced efflorescence (e.g., reduced leaching out of reaction product due to concentration gradients); good color retention; and abrasion resistance depending on where the pavers are being used.

Like pavers, blocks are also pre-cast concrete produced either by casting or pressing processes, or similar compacting processes. Blocks are also referred to as concrete masonry units (CMUs), hollow blocks and concrete blocks. When these blocks are made with fly ash they are called cinder blocks. These blocks generally have a hollow structure. Artificial or man-made paving stones and construction block materials have been studied in efforts to replace the expensive and scarce natural material with low-cost, readily produced mimics. Such efforts, however, have yet to produce in a synthetic material that possesses the desired appearance, texture, density, hardness, porosity and other aesthetics characteristic of stone while at the same can be manufactured in large quantities at low cost with minimal environmental impact.

Blocks are expected to provide better structural property compared to clay bricks (for load bearing masonry structure), and a smoother surface when producing a masonry wall. In addition, interlocking concrete masonry units do not require mortar to bind the units. Some blocks can be used to build a hollow structure that results in good sound and thermal insulation as compared to a solid structure.

Blocks have to generally comply with the requirements of ASTM C90, Standard Specification for Loadbearing Concrete Masonry Units. Blocks that comply with this standard are ensured to be acceptable as regards strength, geometry, durability and fire resistance, and are generally acceptable for use in standard commercial construction projects.

Most artificial stone mimics are prepared by blending natural stone powder and mineral particulate with Portland Cement. The natural stone, mineral and cement blend is mixed with water, formed into the desired shapes, and cured. This method suffers from a number of deficiencies, including poor reproducibility, low yield, deterioration, high finishing costs, unsatisfactory mechanical properties, and the like.

Other artificial stone mimics are prepared by blending natural stone powder and minerals with a synthetic resin (e.g., acrylic, unsaturated polyester, epoxy). These methods also suffer from a number of deficiencies, including poor reproducibility, low yield, deterioration, high finishing costs, unsatisfactory mechanical properties, and the like.

Furthermore, existing methods typically involve large energy consumption and carbon dioxide emission with unfavorable carbon footprint.

There is an on-going need for novel composite paving stones and construction block materials that exhibit good aesthetic and physical characteristics and can be mass-produced at low cost with improved energy consumption and desirable carbon footprint.

SUMMARY OF THE INVENTION

The invention is based in part on the unexpected discovery of novel paving stones and construction block composite materials that can be readily produced from widely available, low cost raw materials in particle form by a process suitable for large-scale production. The raw materials include particulate precursor materials that comprise particulate calcium silicate (e.g., ground wollastonite) that become bonding elements, and particulate filler materials that include minerals (e.g., quartz and other $SiO_2$-bearing materials, mica and feldspar). A fluid component is also provided as a reaction medium, comprising liquid water and/or water vapor and a reagent, carbon dioxide ($CO_2$). Additive materials can include natural or recycled materials, and calcium carbonate-rich and magnesium carbonate-rich materials, as well as additives to the fluid component, such as a water-soluble dispersant. Various additives can be used to fine-tune the physical appearance and mechanical properties of the resulting composite construction material, such as particles of colored materials, such as colored glass, colored sand, and colored quartz particles, and pigments (e.g., black iron oxide, cobalt oxide and chromium oxide). One can use the term "colorants" to refer generally to either or both of colored materials and pigments. In order to simulate a paving stones and construction block appearance, the particulate filler materials can include fine particles. The fine particles can be $SiO_2$ based materials in order to provide hardness or they can comprise a wide variety of materials, including sand, ground, crushed or otherwise comminuted substances selected from minerals and additive materials.

In various embodiments, the invention provides a product that simulates the appearance and "feel' of a similar stone object. By way of example, a synthetic paver product is described. This product is fabricated by use of a mold. The mold of the paver is constructed as a physical "negative" of a structure that simulates the shape and surface irregularities typically observed in a real stone paver, so that a cast synthetic paver is produced with surface features that give the appearance and physical "feel" of the surface of a real stone paver. The surface features can include any of surface irregularities and/or asperities, spaces between adjacent pavers, changes in surface height that occur when one passes from one stone to an adjacent stone, and similar features that simulate one stone and/or a plurality of stones adjacent to each other.

These paving stones and construction block composite materials exhibit surface features typical of stone and display acceptable compressive strength and water absorption as compared to that of natural stone. In addition, the composite construction materials of the invention can be produced using the efficient gas-assisted hydrothermal liquid phase sintering (HLPS) process at low cost and with much improved energy consumption and carbon footprint. In fact, in preferred embodiments of the invention, $CO_2$ is consumed as a reactive species resulting in net sequestration of $CO_2$.

According to one aspect, the invention features a composite construction material. The composite construction material comprises a plurality of bonding elements, wherein each bonding element comprises: a core comprising primarily calcium silicate, a silica-rich first or inner layer, and a calcium carbonate-rich second or outer layer; and a plurality of filler particles comprising fine filler particles, wherein the plurality of bonding elements and the plurality of filler particles together form one or more bonding matrices and the bonding elements and the filler particles are configured to be bonded together as a result of a reaction in which an atmosphere comprising more than 50% carbon dioxide is present. The composite construction material is provided in the form of a paving stone or a construction block.

In one embodiment, the bonding elements and the filler particles are configured to be bonded together as a result of a reaction in which an atmosphere comprising more than 80% carbon dioxide is present.

In yet another embodiment, the composite construction material further comprises a colorant.

In still another embodiment, the plurality of bonding elements have a median particle size in the range from about 5 μm to about 100 μm.

In a further embodiment, the filler particles are made from a silicon dioxide-rich material.

In yet a further embodiment, the plurality of filler particles comprise one or more of quartz, mica and feldspar.

In an additional embodiment, the plurality of bonding elements are chemically transformed from ground wollastonite.

In one more embodiment, the plurality of bonding elements are chemically transformed from a precursor calcium silicate other than wollastonite.

In still a further embodiment, the plurality of bonding elements are chemically transformed from a precursor calcium silicate comprising one or more of aluminum, magnesium and iron.

In one embodiment, the colorant comprises one or more of iron oxide, cobalt oxide and chromium oxide.

In another embodiment, the weight ratio of bonding elements:filler particles is about 8-50:50-92.

In another embodiment, the weight ratio of bonding elements:filler particles is about 5-50:50-95.

In yet another embodiment, the colorant is present in an amount from 0% to about 10% by weight.

In still another embodiment, the plurality of bonding elements are prepared by chemical transformation from ground wollastonite by reacting it with $CO_2$ via a controlled hydrothermal liquid phase sintering process.

In a further embodiment, the plurality of bonding elements are prepared by chemical transformation from the precursor calcium silicate other than wollastonite by reacting it with $CO_2$ via a controlled hydrothermal liquid phase sintering process.

In yet a further embodiment, the composite construction material has a compressive strength in the range of 50 MPa to 300 MPa and a flexural strength in the range of 5 MPa to 30 MPa.

In another embodiment, the composite construction has a compressive strength in the range of 10 to 300 MPa, and a flexural strength in the range of 1 to −30 MPa.

In an additional embodiment, the composite construction material has a water absorption of less than about 10%.

In one more embodiment, the composite construction material exhibits a visual pattern similar to stone.

According to another aspect, the invention relates to an article of manufacture made from a composite construction material described by any of the preceding embodiments.

According to another aspect, the invention relates to a process for preparing a composite construction material. The process comprises the steps of: mixing a particulate composition and a liquid composition to form a slurry mixture, wherein the particulate composition comprises: a ground calcium silicate having a median particle size in the range from about 1 μm to about 100 μm, and a plurality of filler particles comprising fine particles, and wherein the liquid composition comprises: water, and a dispersant; discharging the slurry mixture in a mold; compacting the slurry mixture within the mold and curing the compacted slurry mixture at a temperature in the range from about 20° C. to about 150° C. for about 1 hour to about 80 hours under an atmosphere of water and $CO_2$ having a pressure in the range from ambient atmospheric pressure to about 60 psi above ambient and having a $CO_2$ concentration ranging from about 10% to about 90% to produce a composite construction material. The composite construction material is provided in the form of a paving stone or a construction block.

In one embodiment, the process further comprises the step of vibrating the mold while the slurry mixture is being discharged into the mold and compacted within the mold.

In another embodiment, the particulate composition further comprises a colorant.

In yet another embodiment, curing the mixture is performed at a temperature in the range from about 60° C. to about 110° C. for about 15 hours to about 70 hours under a vapor comprising water and $CO_2$ and having a pressure in the range from about ambient atmospheric pressure to about 30 psi above ambient atmospheric pressure.

In still another embodiment, curing the mixture is performed at a temperature in the range from about 60° C. to about 100° C. for about 20 hours to about 60 hours under a vapor comprising water and $CO_2$ and having a pressure in the range from about ambient atmospheric pressure to about 30 psi above ambient atmospheric pressure.

In a further embodiment, curing the mixture is performed at a temperature equal to or lower than about 60° C. for about 6 to about 50 hours under a vapor comprising water and $CO_2$ and having an ambient atmospheric pressure.

In yet a further embodiment, the ground calcium silicate comprises ground wollastonite, and the plurality of filler particles comprising fine particles comprise a silicon dioxide-rich material.

In an additional embodiment, the ground wollastonite has a median particle size from about 5 μm to about 50 μm, a bulk density from about 0.6 g/mL to about 0.8 g/mL (loose) and about 1.0 g/mL to about 1.2 g/mL (tapped), a surface area from about 1.5 m²/g to about 2.0 m²/g.

In one more embodiment, the plurality of filler particles comprising fine particles comprise one or more of quartz, mica and feldspar.

In still a further embodiment, the particulate composition comprises a pigment comprising a metal oxide.

In one embodiment, the particulate composition comprises a glass material having a color selected from black, white, red, yellow and brown.

In another embodiment, the liquid composition comprises water, and a dispersant comprising a polymer salt having a concentration from about 0.1% to about 2% w/w of the liquid composition.

In yet another embodiment, the polymer salt is an acrylic homopolymer salt.

In still another embodiment, the particulate composition comprises about 25% w/w of ground calcium silicate, and about 70% to about 75% w/w of the silicon dioxide-based material.

In a further embodiment, the ground calcium silicate is primarily ground wollastonite and the silicon dioxide-based material is primarily a material selected from the group consisting of glass, quartz and sand.

In an additional aspect, the invention features a composite construction material prepared by a process according to any of the previous processes.

In one more embodiment, the composite construction material has a compressive strength from about 50 MPa to about 300 MPa and a flexural strength from about 5 MPa to about 30 MPa.

In still a further embodiment, the composite construction material has a water absorption of less than about 10%.

In another embodiment, the composite construction material comprises a colorant having a color selected from black, white, red, yellow and brown.

In yet another embodiment, the composite construction material exhibiting a visual pattern unique to stone.

In still another embodiment, the invention deals with an article of manufacture made from a composite construction material.

According to still a further aspect, the invention relates to a composite construction material. The construction material comprises a plurality of bonding elements, wherein each bonding element comprises: a core comprising primarily magnesium silicate, a silica-rich first or inner layer, and a magnesium carbonate-rich second or outer layer; and a plurality of filler particles, wherein the plurality of bonding elements and the plurality of filler particles together form one or more bonding matrices and the bonding elements and the filler particles are substantially evenly dispersed therein and bonded together, whereby the composite construction material exhibits one or more textures and patterns similar to a natural stone.

DETAILED DESCRIPTION OF THE INVENTION

Figure 1:
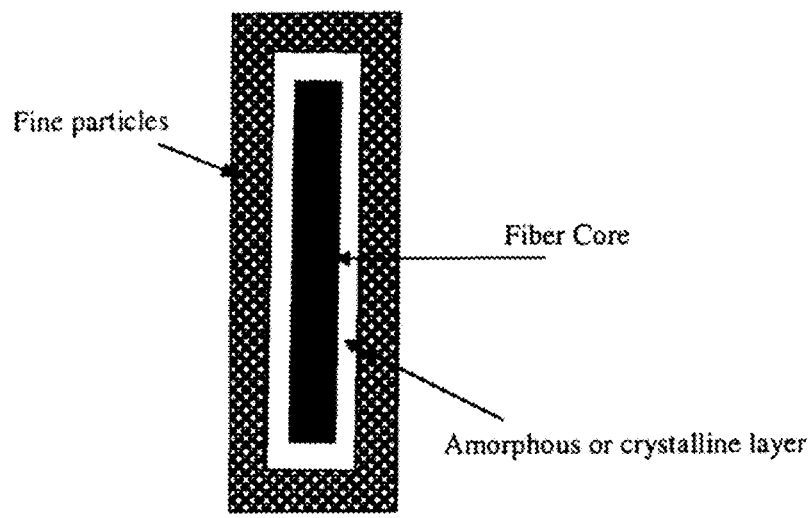
FIGS. 1(a)-1(c) are schematic illustrations of cross-sections of bonding elements according to exemplary embodiments of the present invention, including three exemplary core morphologies: (a) fibrous, (b) elliptical, and (c) equiaxed.
Figure 1:
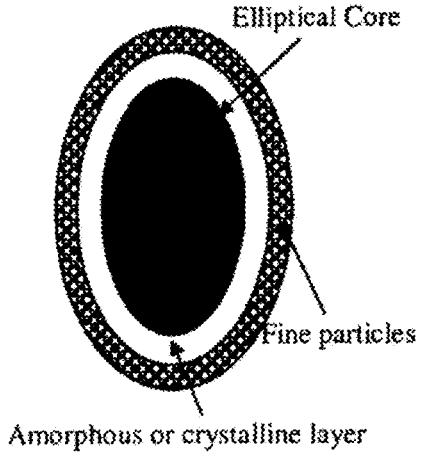
Figure 1:
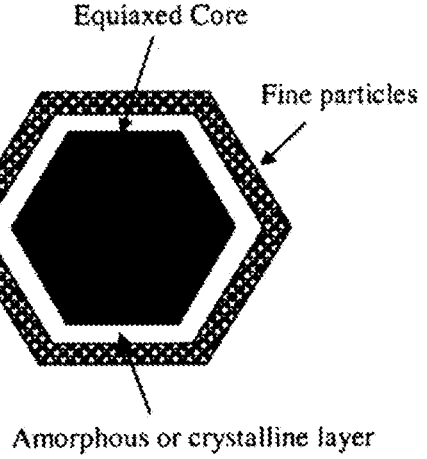

This invention explains the method to form and cure concrete pavers that utilize a binder that is cured by reaction with carbon dioxide and thereby being an effective method for sequestration of carbon dioxide. This invention also leads to concrete pavers with reduced primary efflorescence as compared to that of conventional pavers made with Portland cement. The invention leads to a method to utilize fillers that are not compatible with Portland cement concretes. We describe both pavers and blocks formed by compacting a mixture of precursor materials, followed by a reaction in which carbon dioxide is used as a reagent, and water is used as a reaction medium.

Our paving stones and construction block composites contain filter materials that are fine grained. The filler will primarily comprise an $SiO_2$-based material, such as quartz, to give the product hardness. We define "$SiO_2$ based material" to include any of quartz, common sands (construction and masonry), glass and recycled glass and other natural and synthetic materials that contain significant amounts of $SiO_2$, including mica (aluminum silicate) and feldspar (aluminum silicate-based material). In alternative embodiments, the paving stones and construction block products may contain calcium carbonate ($CaCO_3$) or other carbonate-based materials where hardness is not a requirement.

This invention provides novel composite materials that exhibit paving stones and construction block properties and can be readily produced from widely available, low cost raw materials by a process suitable for large-scale production with minimal environmental impact. The raw materials include inexpensive calcium silicate, for example, ground wollastonite, and filler material for example fine particles. The fine particles are principally $SiO_2$ based materials in order to provide hardness. The fine particles can include minerals (e.g., quartz and other $SiO_2$-bearing materials, mica and feldspar). Other key process components include water and $CO_2$. Various additives can be used to modify and fine-tune the physical appearance and/or mechanical properties of the resulting composite material, such as using pigments (e.g., black iron oxide, cobalt oxide and chromium oxide).

These composite materials display various paving stones and construction block patterns, textures and other characteristics, such as visual patterns of various colors that are unique to stone. In addition, the composite materials of the invention exhibit compressive strength and flexural strength that are superior to stone and water absorption that is lower than that of stone. The composite materials of the invention are superior to natural stone in that they are impervious to the degradation from weather and the like that occurs with natural stone. The composite materials of the invention are superior to natural stone made with synthetic resin in that they are not subject to damage by fire that would consume stone. Furthermore, the composite materials can be produced, as disclosed herein, using the energy-efficient HLPS process and can be manufactured at low cost and with favorable environmental impact. For example in preferred embodiments of the invention, $CO_2$ is used as a reactive species resulting in sequestration of $CO_2$ in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions on various aspects of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 20090142578 (application Ser. No. 12/271,513), WO 2009/102360 (PCT/US2008/083606), WO 2011/053598 (PCT/US2010/054146), WO 2011/090967 (PCT/US2011/021623), U.S. application Ser. No. 13/411,218 filed Mar. 2, 2012 (Riman et al.), U.S. application Ser. No. 13/491,098 filed Jun. 7, 2012 (Riman et al), U.S. Provisional Patent Application No. 61/708,423 filed Oct. 1, 2012, and U.S. Provisional Patent Application Nos. 61/709,435, 61/709,453, 61/709,461, and 61/709,476, all filed Oct. 4, 2012, each of which is expressly incorporated herein by reference in its entirety for all purposes.

In one aspect, the invention generally relates to a composite material that includes a plurality of bonding elements and a plurality of filler particles. Each bonding element includes a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together. The composite material exhibits one or more substantially paving stones and construction block textures, patterns and physical properties.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

The plurality of bonding elements may have any suitable median particle size and size distribution dependent on the desired composite material. In certain embodiments, the plurality of bonding elements have a median particle size in the range of about 5 μm to about 100 μm (e.g., about 5 μm to about 80 μm, about 5 μm to about 60 μm, about 5 μm to about 50 μm, about 5 μm to about 40 μm, about 5 μm to about 30 μm, about 5 μm to about 20 μm, about 5 μm to about 10 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

The plurality of filler particles may have any suitable median particle size and size distribution. In certain embodiments, the plurality of filler particles has a median particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

In certain preferred embodiments, the filler particles are made from one or more of SiO2-based or silicate-based material such as quartz ($SiO_2$), mica (aluminum silicate) and feldspar (aluminum silicate-based material) (e.g., ground quartz, ground mica, ground feldspar).

In certain embodiments, filler particles may include natural, synthetic and recycled materials such as glass, recycled glass, coal slag, calcium carbonate-rich material and magnesium carbonate-rich material.

The plurality of bonding elements may be chemically transformed from any suitable precursor materials, for example, from a precursor calcium silicate other than wollastonite. The precursor calcium silicate may include one or more chemical elements of aluminum, magnesium and iron.

As used herein, the term "calcium silicate" refers to naturally-occurring minerals or synthetic materials that are comprised of one or more of a group of calcium-silicon-containing compounds including $CaSiO_3$ (also known as "wollastonite" or "pseudo-wollastonite" and sometimes formulated as $CaO.SiO_2$), $Ca_3Si_2O_7$ (also known as "Rankinite" and sometimes formulated as $3CaO.2SiO_2$), $Ca_2SiO_4$ (also known as "Belite" and sometimes formulated as $2CaO.SiO_2$), $Ca_3SiO_5$ (also known as "Alite" and sometimes formulated as $3CaO.SiO_2$), which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It should be understood that, compositions and methods disclosed herein can be adopted to use magnesium silicate in place of or in addition to calcium silicate. As used herein, the term "magnesium silicate" refers to naturally-occurring minerals or synthetic materials that are comprised of one or more of a groups of magnesium-silicon-containing compounds including, for example, $Mg_2SiO_4$ (also known as "Fosterite") and $Mg_3Si_4O_{10}(OH)_2$) (also known as "Talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

The weight ratio of (bonding elements):(filler particles) may be any suitable rations dependent on the desired composite material, for example, in the range of about (15 to 50):about (50 to 85).

In certain preferred embodiments, the plurality of bonding elements are prepared by chemical transformation from ground wollastonite (or a non-wollastonite precursor calcium silicate or magnesium silicate) by reacting it with $CO_2$ via a gas-assisted HLPS process.

In certain embodiments, the composite material is characterized by a compressive strength from about 50 MPa to about 300 MPa (e.g., about 50 MPa to about 250 MPa, about 50 MPa to about 200 MPa, about 50 MPa to about 180 MPa, about 50 MPa to about 160 MPa, about 50 MPa to about 150 MPa, about 50 MPa to about 140 MPa, about 100 MPa to about 300 MPa, about 130 MPa to about 300 MPa, about 140 MPa to about 300 MPa, about 150 MPa to about 300 MPa, about 200 to about 300 MPa).

In certain embodiments, the composite material is characterized by a flexural strength from about 5 MPa to about 40 MPa (e.g., about 5 MPa to about 35 MPa, about 5 MPa to about 30 MPa, about 5 MPa to about 25 MPa, about 5 MPa to about 20 MPa, about 10 MPa to about 40 MPa, about 15 MPa to about 35 MPa, about 15 MPa to about 30 MPa).

In certain embodiments, the composite material is characterized by water absorption of less than about 10% (e.g., less than about 8%, 5%, 4%, 3%, 2%, 1%).

In certain embodiments, the composite material has less than about 10% by weight of one or more minerals selected from calcium carbonate and magnesium carbonate.

The composite material may display any desired textures and patterns, in particular those that are characteristic of stone. In certain preferred embodiments, the composite material exhibits a visual pattern unique to stone. Other paving stones and construction block characteristics include colors (e.g., black, white, red, yellow, brown).

As used herein, the term "slurry" is intended to connote a wet mixture. See Example 1, hereinafter, in which a wet mixture of approximately 95% solids by weight is mixed with approximately 5% liquid by weight to form a wet mixture, also referred to as a slurry.

In another aspect, the invention generally relates to a process for preparing a composite material. The process includes: mixing a particulate composition and a liquid composition to form a slurry mixture; discharging the slurry into a mold having the geometry of a paver or block, compacting the slurry in the mold to form a solid part in the shape of a paver or a block; and curing the solid part at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a paving stones and construction block texture and pattern.

In another aspect, the invention generally relates to a process wherein the mold is vibrated while the slurry is being discharged into the mold and compacted within the mold.

The particulate composition includes a ground calcium silicate having a median particle size in the range from about 1 μm to about 100 μm, and a ground $SiO_2$ bearing material having a median particle size in the range from about 0.2 mm to about 7 mm. The liquid composition includes water and a water-soluble dispersant.

The process can further include, before curing the mixture, the step of drying the mixture. The particulate composition further comprises a pigment or a colorant as discussed herein.

In certain embodiments, curing the mixture is performed at a temperature in the range from about 40° C. to about 120° C. for about 5 hours to about 70 hours under a vapor comprising water and $CO_2$ and having a pressure in the range from about ambient atmospheric pressure to about 30 psi above ambient atmospheric pressure.

In certain embodiments, curing the mixture is performed at a temperature in the range from about 60° C. to about 110° C. for about 15 hours to about 70 hours under a vapor comprising water and $CO_2$ and having a pressure in the range from about ambient atmospheric pressure to about 30 psi above ambient atmospheric pressure.

In certain embodiments, curing the mixture is performed at a temperature in the range from about 80° C. to about 100° C. for about 20 hours to about 60 hours under a vapor comprising water and $CO_2$ and having a pressure in the range from about ambient atmospheric pressure to about 30 psi above ambient atmospheric pressure.

In certain embodiments, curing the mixture is performed at a temperature equal to or lower than about 60° C. for about 15 to about 50 hours under a vapor comprising water and $CO_2$ and having an ambient atmospheric pressure.

For example, in some embodiments, the ground wollastonite has a median particle size from about 5 μm to about 50 μm (e.g., about 5 μm, 10 μm, 15 μm, 20 μm, 25 μm, 30 μm, 40 μm, 90 μm), a bulk density from about 0.6 g/mL to about 0.8 g/mL (loose) and about 1.0 g/mL to about 1.2 g/mL (tapped), a surface area from about 1.5 $m^2$/g to about 2.0 $m^2$/g. The first ground $SiO_2$ bearing material has a median particle size from about 40 μm to about 90 μm (e.g., about 40 μm, 50 μm, 60 μm, 70 μm, 80 μm, 30 μm, 90 μm), a bulk density from about 0.7 g/mL to about 0.9 g/mL (loose) and about 1.3 g/mL to about 1.6 g/mL (tapped).

In certain preferred embodiments, the liquid composition includes water and a water-soluble dispersant comprising a polymer salt (e.g., an acrylic homopolymer salt) having a concentration from about 0.1% to about 2% w/w of the liquid composition.

In yet another aspect, the invention generally relates to a composite material prepared according to a process disclosed herein, for example, a composite material having a compressive strength from about 50 MPa to about 300 MPa and a flexural strength from about 5 MPa to about 30 MPa, having a water absorption of less than about 10%, having a pigment having a color selected from black, white, red, yellow and brown and other colors not found in the natural analog, and/or exhibiting a visual pattern unique to stone.

In yet another aspect, the invention generally relates to an article of manufacture made from a composite material disclosed herein.

Any suitable precursor materials may be employed. For example calcium silicate particles formed primarily of wollastonite, $CaSiO_3$, can react with carbon dioxide dissolved in water. It is believed that calcium cations are leached from the wollastonite and transform the peripheral portion of the wollastonite core into calcium-deficient wollastonite. As the calcium cations continue to be leached from the peripheral portion of the core, the structure of the peripheral portion eventually become unstable and breaks down, thereby transforming the calcium-deficient wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1):

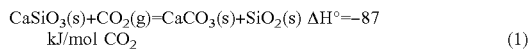
$$CaSiO_3(s)+CO_2(g)=CaCO_3(s)+SiO_2(s) \quad \Delta H°=-87 \text{ kJ/mol } CO_2 \tag{1}$$

For example, in a silicate mineral carbonation reaction such as with wollastonite, $CO_2$ is introduced as a gas phase that dissolves into an infiltration fluid, such as water. The dissolution of $CO_2$ forms acidic carbonic species that results in a decrease of pH in solution. The weakly acidic solution incongruently dissolves calcium species from $CaSiO_3$. The released calcium cations and the dissociated carbonate species lead to the precipitation of insoluble carbonates. Silica-rich layers are thought to remain on the mineral particles as depletion layers.

Thus, according to a preferred embodiment of the invention, $CO_2$ preferentially reacts with the calcium cations of the wollastonite precursor core, thereby transforming the peripheral portion of the precursor core into a silica-rich first layer and a calcium carbonate-rich second layer. Also, the presence of the first and second layers on the core act as a barrier to further reaction between wollastonite and carbon dioxide, resulting in the bonding element having the core, first layer and second layer.

In some embodiments, silicate materials having metals other than Ca or in addition to Ca, for example Fosterite ($Mg_2SiO_4$), Diopside ($CaMgSi_2O_6$), and Talc ($Mg_3Si_4O_{10}(OH)_2$) can react with carbon dioxide dissolved in water in a manner similar to the reaction of wollastonite, as described above. It is believed that such silicate materials can be used, alone, in combination, and/or in combination with wollastonite, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, $87^{th}$ Edition 2006-2007, CRC.) This partially infiltrated state enables the reaction to proceed to a high degree of carbonation in a fixed period of time.

Liquid water in the pores speeds up the reaction rate because it is essential for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is delivered to the precursor materials in liquid form with $CO_2$ dissolved therein and the curing process is conducted at about 90° C. and about 20 psig (i.e., 20 psi above ambient pressure) for about 48 hours. In a second exemplary embodiment, water is present in the precursor material (e.g., as residual water from prior mixing step) and water vapor is provided to precursor materials (e.g., to maintain water level and/or prevent loss of water from evaporating) along with $CO_2$ and the curing process is performed at about 60° C. and 0 psig (at ambient atmospheric pressure) for about 19 hours. In a third exemplary embodiment, water is delivered to precursor materials in vapor form along with $CO_2$ and the curing process is performed at about 90° C. and 20 psig (20 psi above ambient atmospheric pressure) for about 19 hours.

In yet another aspect, the invention generally relates to a composite material that includes: a plurality of bonding elements and a plurality of filler particles. Each bonding element includes: a core comprising primarily magnesium silicate, a silica-rich first or inner layer, and a magnesium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more substantially paving stones and construction block textures, patterns and physical properties.

Compositions and methods disclosed herein in connection with calcium silicate can be adopted to use magnesium silicate in place of or in addition to calcium silicate.

Bonding Elements, Bonding Matrices and Composite Materials

A. Bonding Elements

As schematically illustrated in FIGS. 1(a)-1(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Precursor particles can be selected from any suitable material that can undergo suitable transformation to form the desired bonding elements. For example, the precursor particles may include oxides and non-oxides of silicon, titanium, aluminum, phosphorus, vanadium, tungsten, molybdenum, gallium, manganese, zirconium, germanium, copper, niobium, cobalt, lead, iron, indium, arsenic, tantalum, and/or alkaline earth elements (beryllium, magnesium, calcium, strontium, barium and radium).

Exemplary precursor materials include oxides such as silicates, titanates, aluminates, phosphates, vanadates, tungstates, molybdates, gallates, manganates, zirconates, germinates, cuprates, stannates, hafnates, chromates, niobates, cobaltates, plumbates, ferrites, indates, arsenates, tantalates and combinations thereof. In some embodiments, the precursor particles include silicates such as orthosilicates, sorosilicates, cyclosilicates, inosilicates, phyllosilicates, tectosilicates and/or calcium silicate hydrate.

Certain waste materials may be used as the precursor particles for some applications. Waste materials may include, for example, minerals, industrial waste, or an industrial chemical material. Some exemplary waste materials include mineral silicate, iron ore, periclase, gypsum, iron (II) huydroxide, fly ash, bottom ash, slag, glass, oil shells, red mud, battery waste, recycled concrete, mine tailings, paper ash, or salts from concentrated reverse osmosis brine.

Additional precursor particles may include different types of rock containing minerals such as cal-silicate rock, fitch formation, hebron gneiss, layered gneiss, middle member, argillite, quartzite, intermediate Precambrian sediments, dark-colored, feldpathic quartzite with minor limestone beds, high-grade metasedimentry biotite schist, biotite gniss, mica schist, quartzite, hoosac formation, partridge formation, Washington gneiss, Devonian, Silurian greenvale cove formation, ocoee supergroup, metasandstone, metagraywacke, Rangeley formation, amphibolites, calcitic and dolomite marble, manhattan formation, rusty and gray biotite-quartz-feldspar gneiss, and waterford group.

Precursor particles may also include igneous rocks such as, andesite, anorthosite, basinite, boninite, carbonatite and charnockite, sedimentary materials such as, but not limited to, argillite, arkose, breccias, cataclasite, chalk, claystone, chert, flint, gitsone, lighine, limestone, mudstone, sandstone, shale, and siltsone, metamorphic materials such as, but not limited to, amphibolites, epidiorite, gneiss, granulite, greenstone, hornfels, marble, pelite, phyllite, quartzite, shist, skarn, slate, talc carbonate, and soapstone, and other varieties of rocks such as, but not limited to, adamellite, appinite, aphanites, borolanite, epidosite, felsites, flint, ganister, ijolite, jadeitite, jasproid, kenyte, vogesite, larvikite, litchfieldite, luxullianite, mangerite, minette, novaculite, pyrolite, rhomb porphyry, shonkinite, taconite, teschenite, theralite, and variolite.

Table 1 provides exemplary embodiments of different types of chemistries for the first and second layers that can be achieved when using different precursor materials. Regarding the first layer, by using different precursor materials one may obtain silica, alumina or titania. The second layer may also be modified with the selection of the precursor material. For example, the second layer may include various types of carbonates such as, pure carbonates, multiple cations carbonates, carbonates with water or an OH group, layered carbonates with either water or an OH group, anion containing carbonates, silicate containing carbonates, and carbonate-bearing minerals.

TABLE 1

Exemplary Precursors and Encapsulating layers

| Raw Material (Precursor) | First Layer | Encapsulating Layer |
|---|---|---|
| Wollastonite ($CaSiO_3$) | Silica-rich | $CaCO_3$ |
| Fosterite ($Mg_2SiO_4$) | | $MgCO_3$ |
| Diopside ($CaMgSi_2O_6$) | | $(Ca,Mg)CO_3$ |
| Talc ($Mg_3Si_4O_{10}(OH)_2$) | | $MgCO_3 \cdot xH_2O$ (x = 1-5) |
| Glaucophane ($Na_2Mg_3Al_2Si_8O_{22}(OH)_2$) | Alumina and/or | $MgCO_3$ and/or $NaAlCO_3(OH)_2$ |
| Palygorskite (($Mg,Al)_2Si_4O_{10}(OH) \cdot 4(H_2O)$) | Silica-rich | $Mg_6Al_2CO_3(OH)_{16} \cdot 4H_2O$ |
| Meionite ($Ca_4(Al_2Si_2O_8)_3(Cl_2CO_3,SO_4)$) | | $Ca_2SO_4CO_3 \cdot 4H_2O$ |
| Tanzanite ($Ca_2Al_3O(SiO_4)(Si_2O_7)(OH)$) | | $Ca_5Si_2O_8CO_3$ and/or $Ca_5Si_2O_8CO_3$ and/or $Ca_7Si_6O_{18}CO_3 \cdot 2H_2O$ |
| $(Ba_{0.6}Sr_{0.3}Ca_{0.1})TiO_3$ | Titania-rich | $Sr(Sr,Ca,Ba)(CO_3)_2$ |

The second layer may be modified by introducing additional anions and/or cations. Such additional anions and cations may be used to modify the second layer to increase its physical and chemical properties such as fire resistance or acid resistance. For example, as shown in Table 2, while the first layer is retained as a silica-rich layer, the second layer may be modified by adding extra anions or cations to the reaction, such as $PO_4^{2-}$ and $SO_4^{2-}$. As a result, the second layer may include, for example, different phosphate, sulphate, fluoride or combinations thereof.

TABLE 2

Examples of Cation/Anion Sources (in addition to $CO_3^{2-}$)

| Core Particle | First Layer | Extra anion/cation source | Encapsulating Layer | Carbonate Type |
|---|---|---|---|---|
| $CaSiO_3$ | Silica-rich layer | Phosphates | $Ca_5(PO_4,CO_3)_3OH$ | Phosphate bearing carbonates |
| | | Sulphates | $Ca_2SO_4CO_3 \cdot 4H_2O$ | Sulphate bearing carbonates |
| | | Fluorides | $Ca_2CO_3F_2$ | Fluorides bearing carbonates |
| | | Phosphates and fluorides | $Ca_5(PO_4,CO_3)_3F$ | Fluoride and phosphates bearing carbonates |
| | | $Mg^{+2}$ source like chlorides, nitrates, hydroxides etc. | $CaMg(CO_3)_2$ | Multiple cation carbonates |
| | | A combination of cation and anion sources | $Ca_6Mg_2(SO_4)_2(CO_3)_2Cl_4(OH)_4 \cdot 7H_2O$ | Post-1992 Carbonate-Bearing Minerals |

B. Bonding Matrix and Composite Material

A bonding matrix comprises a plurality of bonding elements, forming a three-dimensional network. The bonding matrix may be porous or non-porous. The degree of porosity depends on a number of variables that can be used to control porosity, such as temperature, reactor design, the precursor material and the amount of liquid that is introduced during the transformation process. Depending on the intended application, the porosity can be set to almost any degree of porosity from about 1 vol. % to about 99 vol. %.

The bonding matrix may incorporate one or more filler materials, which are mixed with the precursor materials prior to or during the transformation process to create the composite material. The concentration of bonding elements in the bonding matrix may vary. For example, the concentration of bonding elements on a volume basis may be relatively high, wherein at least some of the bonding elements are in contact with one another. This situation may arise if filler material is incorporated into the bonding matrix, but the type of filler material and/or the amount of filler material is such that the level of volumetric dilution of the bonding element is relatively low. In another example, the concentration of bonding elements on a volume basis may be relatively low, wherein the bonding elements are more widely dispersed within the bonding matrix such that few, if any of the bonding elements are in contact with one another. This situation may arise if filler material is incorporated into the bonding matrix, and the type of filler material and/or the amount of filler material is such that the level of dilution is relatively high.

In general, the filler material may include any one of a number of types of materials that can be incorporated into the bonding matrix. A filler material may be inert or active. An inert material does not go through any chemical reaction during the transformation and does not act as a nucleation site, although it may physically or mechanically interact with the bonding matrix. The inert material may involve polymers, metals, inorganic particles, aggregates, and the like. Specific examples may include, but are not limited to basalt, stone, recycled PVC, rubber, metal particles, alumina particle, zirconia particles, carbon-particles, carpet particles, Kevlar™ particles and combinations thereof. An active material chemically reacts with the bonding matrix during the transformation go through any chemical reaction during the transformation and/or acts as a nucleation site. For example, magnesium hydroxide may be used as a filler material and may chemically react with a dissolving calcium component phase from the bonding matrix to form magnesium calcium carbonate.

The bonding matrix may occupy almost any percentage of a composite material. Thus, for example, the bonding matrix may occupy about 1 vol. % to about 99 vol. % of the composite material (e.g., the volume fraction of the bonding matrix can be less than or equal to about 90 vol. %, 70 vol. %, 50 vol. %, 40 vol. %, 30 vol. %, 20 vol. %, 10 vol. %). A preferred range for the volume fraction of the bonding matrix is about 8 vol. % to about 90 vol. % (e.g., about 8 vol. % to about 80 vol. %, about 8 vol. % to about 70 vol. %, about 8 vol. % to about 50 vol. %, about 8 vol. % to about 40 vol. %), and more preferred range of about 8 vol. % to 30 vol. %.

A composite material may also be porous or non-porous. The degree of porosity depends on a number of variables that can be used to control porosity, such as temperature, reactor design, the precursor material, the amount of liquid that is introduced during the transformation process and whether any filler is employed. Depending on the intended application, the porosity can be set to almost any degree of porosity from about 1 vol. % to about 99 vol. % (e.g., less than or equal to about 90 vol. %, 70 vol. %, 50 vol. %, 40 vol. %, 30 vol. %, 20 vol. %, 10 vol. %). A preferred range of porosity for the composite material is about 1 vol. % to about 70 vol. %, more preferably between about 1 vol. % and about 10 vol. % for high density and durability and between about 50 vol. % and about 70 vol. % for lightweight and low thermal conductivity.

Figure 2:
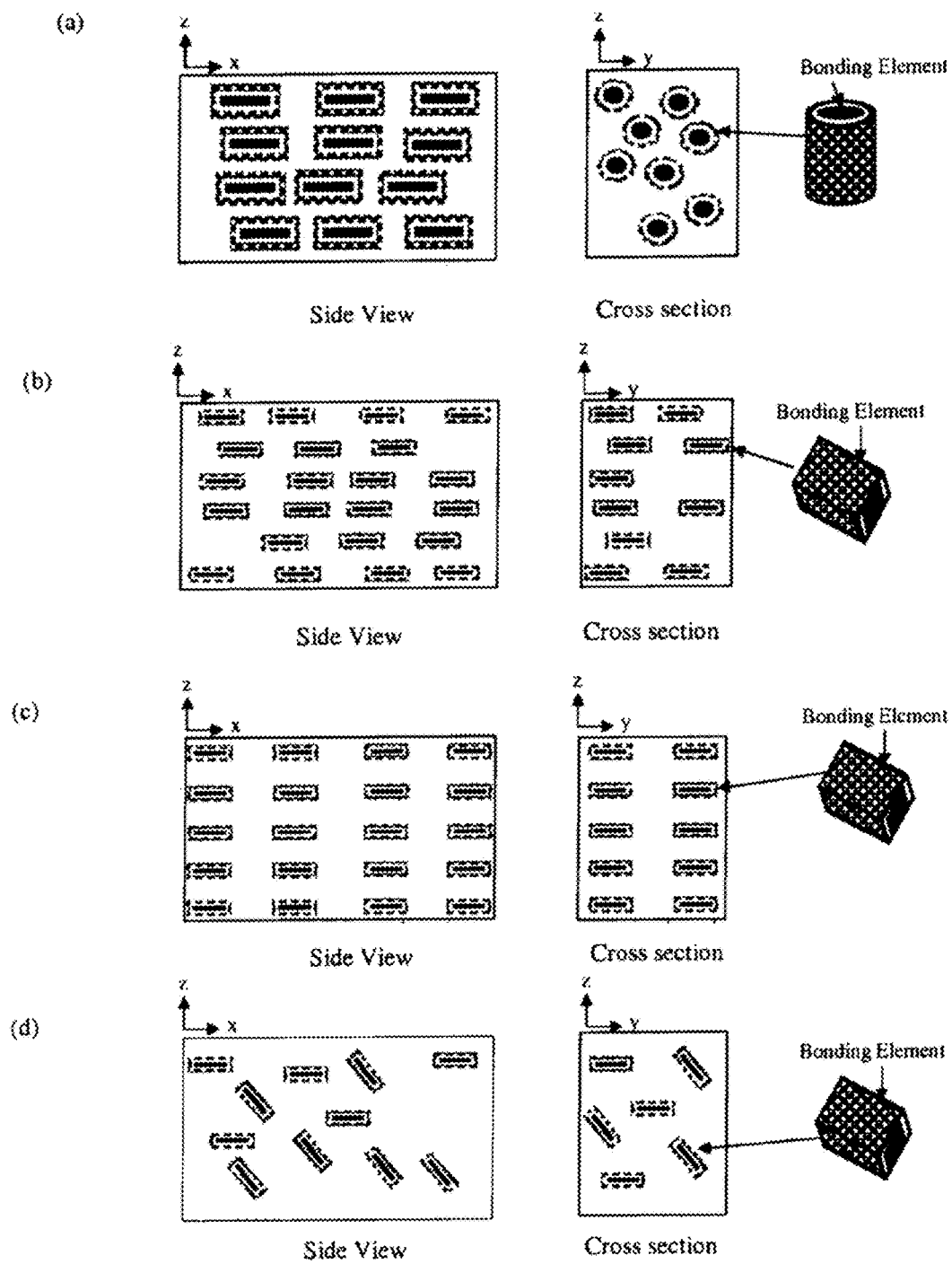
FIGS. 2(a)-2(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.
Figure 2:
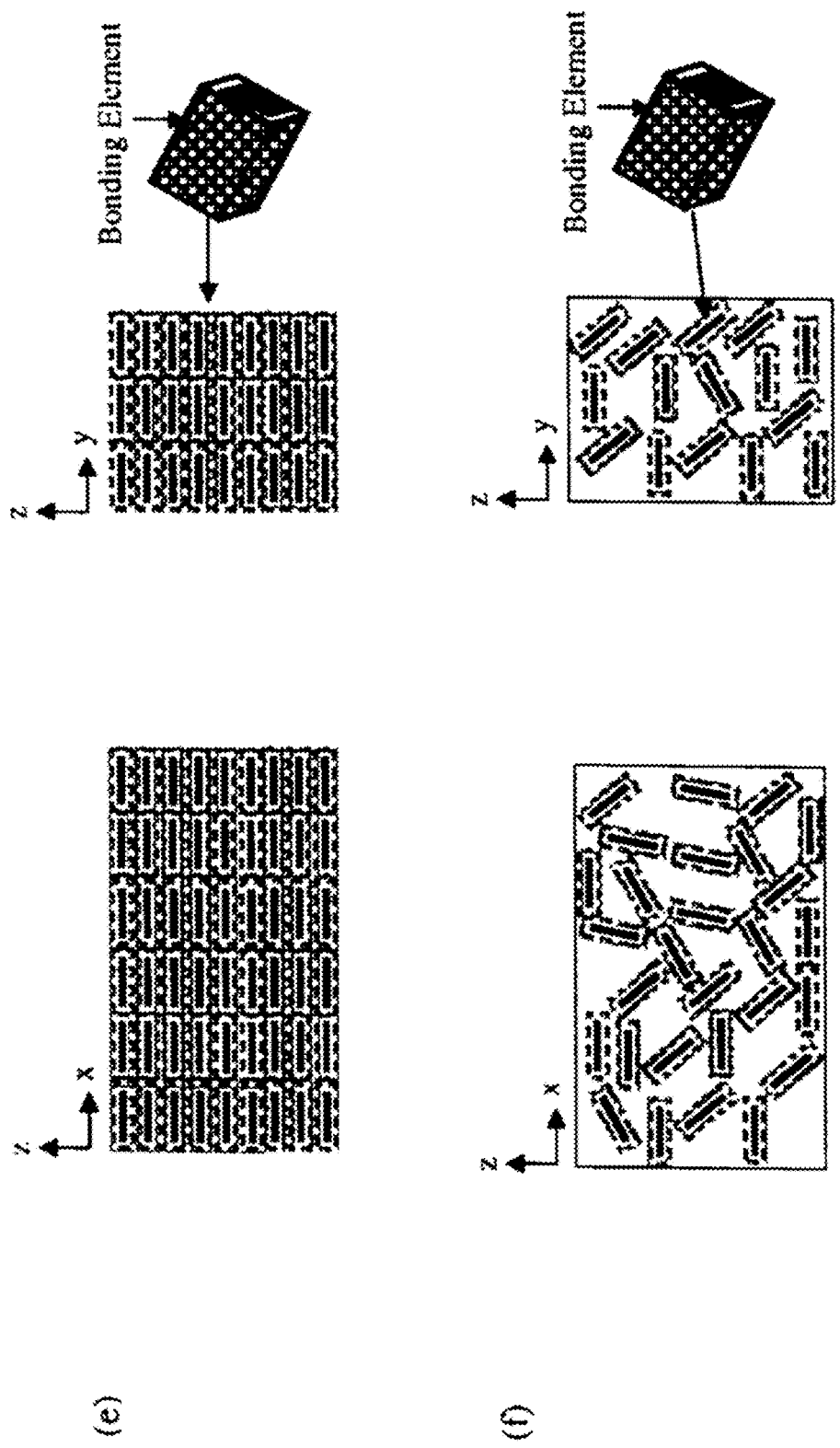

Within the bonding matrix, the bonding elements may be positioned, relative to each other, in any one of a number of orientations. FIGS. 2(a)-2(f) schematically illustrate an exemplary bonding matrix that includes fiber- or platelet-shaped bonding elements in different orientations possibly diluted by the incorporation of filler material, as represented by the spacing between the bonding elements. FIG. 2(a), for example, illustrates a bonding matrix that includes fiber-shaped bonding elements aligned in a one-direction ("1-D") orientation (e.g., aligned with respect to the x direction). FIG. 2(b) illustrates a bonding matrix that includes platelet-shaped bonding elements aligned in a two-direction ("2-D") orientation (e.g., aligned with respect to the x and y directions). FIG. 2(c) illustrates a bonding matrix that includes platelet-shaped bonding elements aligned in a three-direction ("3-D") orientation (e.g., aligned with respect to the x, y and z directions). FIG. 2(d) illustrates a bonding matrix that includes platelet-shaped bonding elements in a random orientation, wherein the bonding elements are not aligned with respect to any particular direction. FIG. 2(e) illustrates a bonding matrix that includes a relatively high concentration of platelet-shaped bonding elements that are aligned in a 3-D orientation. FIG. 2(f) illustrates a bonding matrix that includes a relatively low concentration of platelet-shaped bonding elements that are situated in a random orientation (a percolation network). The composite material of FIG. 2(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 2(e), or random orientation, e.g., FIG. 2(f), of bonding elements. Examples of connectivity patterns can be found in, for example, Newnham, et al., "Connectivity and piezoelectric-pyroelectric composites", Mat. Res. Bull. vol. 13, pp. 525-536, 1978).

Furthermore, one or multi-level repeating hierarchic structure can be achieved in a manner that can promote dense packing, which provides for making a strong material, among other potential useful, functional purposes. Hierarchy describes how structures form patterns on several length scales. Different types of bonding matrices can be created by varying the matrix porosity and by incorporating core fibers of different sizes. Different kinds of particulate and fiber components can be used with hierarchic structures to fabricate different kinds of structures with different connectivity.

Processes of Forming the Bonding Elements, Bonding Matrices and Composite Materials The transformation (curing) process proceeds by exposing the precursor material to a reactive liquid. A reactant associated with the liquid reacts with the chemical ingredients that make up the precursor particles, and more specifically, the chemical reactants in the peripheral portion of the precursor particles. This reaction eventually results in the formation of the first and second layers.

In some embodiments, the precursor particles include two or more chemical elements. During the transformation process, the reactant in the liquid preferentially reacts with at least a first one of the chemical elements, wherein the reaction between the reactant in the liquid (e.g., $CO_2$ and related species in solution) and the at least one first chemical element (e.g., calcium$^{2+}$) results in the formation of the first and second layers, the first layer comprising a derivative of the precursor particle, generally excluding the at least one first chemical element, whereas the second layer comprises a combination (e.g., $CaCO_3$) of the reactant and the at least one first chemical element. In comparison, the core comprises the same or nearly the same chemical composition as the precursor particle (e.g., $CaSiO_3$). For example, peripheral portions of the core may vary from the chemical composition of the precursor particle due to selective leaching of particular chemical elements from the core.

Thus, the core and the second layer share the at least one first chemical element (e.g., calcium$^{2+}$) of the precursor particle, and the core and the first layer share at least another one of the chemical elements of the precursor particle (e.g., $Si^{4+}$). The at least one first chemical element shared by the core and the second layer may be, for example, at least one alkaline earth element (beryllium, magnesium, calcium, strontium, barium and radium). The at least another one of the chemical elements shared by the core and the first layer may be, for example, silicon, titanium, aluminum, phosphorus, vanadium, tungsten, molybdenum, gallium, manganese, zirconium, germanium, copper, niobium, cobalt, lead, iron, indium, arsenic and/or tantalum.

In some embodiments, the reaction between the reactant in the liquid phase and the at least one first chemical element of the precursor particles may be carried out to completion thus resulting in the first layer becoming the core of the bonding element and having a chemical composition that is different from that of the precursor particles, and at least one additional or second shell layer comprising a composition that may or may not include the at least one first chemical element of the two or more chemical elements of the precursor particles.

A. Gas-assisted Hydrothermal Liquid Phase Sintering

The bonding elements may be formed, for example, by a method based on gas-assisted HLPS. In such a method, a porous solid body including a plurality of precursor particles is exposed to a liquid (solvent), which partially saturates the pores of the porous solid body, meaning that the volume of the pores are partially filled with water.

In certain systems such as those forming carbonate, completely filling the pores with water is believed to be undesirable because the reactive gas is unable to diffuse from the outer surface of the porous solid body to all of the internal pores by gaseous diffusion. Instead, the reactant of the reactive gas would dissolve in the liquid and diffuse in the liquid phase from the outer surface to the internal pores, which is much slower. This liquid-phase diffusion may be suitable for transforming thin porous solid bodies but would be unsuitable for thicker porous solid bodies.

In some embodiments, a gas containing a reactant is introduced into the partially saturated pores of the porous solid body and the reactant is dissolved by the solvent. The dissolved reactant then reacts with the at least first chemical element in the precursor particle to transform the peripheral portion of the precursor particle into the first layer and the second layer. As a result of the reaction, the dissolved reactant is depleted from the solvent. Meanwhile, the gas containing the reactant continues to be introduced into the partially saturated pores to supply additional reactant to the solvent.

As the reaction between the reactant and the at least first chemical element of the precursor particles progresses, the peripheral portion of the precursor particle is transformed into the first layer and the second layer. The presence of the first layer at the periphery of the core eventually hinders further reaction by separating the reactant and the at least first chemical element of the precursor particle, thereby causing the reaction to effectively stop, leaving a bonding element having the core as the unreacted center of the precursor particle, the first layer at a periphery of the core, and a second layer on the first layer.

The resulting bonding element includes the core, the first layer and the second layer, and is generally larger in size than the precursor particle, filling in the surrounding porous regions of the porous solid body and possibly bonding with adjacent materials in the porous solid body. As a result, net-shape formation of products may be formed that have substantially the same size and shape as but a higher density than the porous solid body. This is an advantage over traditionally sintering processes that cause shrinkage from mass transport to produce a higher density material than the initial powder compact.

B. HLPS in an Autoclave

In an exemplary embodiment of the method of HLPS, a porous solid body comprising a plurality of precursor particles is placed in an autoclave chamber and heated. Water as a solvent is introduced into the pores of the porous solid body by vaporizing the water in the chamber. A cooling plate above the porous solid body condenses the evaporated water that then drips onto the porous body and into the pore of the porous solid body, thus partially saturating the pores of the porous solid body. However, the method of introducing water in this example is one of several ways that water can be delivered. For example, the water can also be heated and sprayed.

Meanwhile, carbon dioxide as a reactant is pumped into the chamber, and the carbon dioxide diffuses into the partially saturated pores of the porous body. Once in the pores, the carbon dioxide dissolves in the water, thus allowing the reaction between the precursor particles and the carbon dioxide to transform the peripheral portions of the precursor particles into the first and second layers.

As the reaction between the second reactant and the first layer progresses, the second reactant continues to react with the first layer, transforming the peripheral portion of the first layer into the second layer. The formation of the second layer may be by the exo-solution of a component in the first layer, and such a second layer may be a gradient layer, wherein the concentration of one of the chemical elements (cations) making up the second layer varies from high to low as you move from the core particle surface to the end of the first layer. It is also possible that the second layer can be a gradient composition as well, such as when the layers are either amorphous or made up of solid solutions that have either constant or varying compositions.

The presence of the second layer at the periphery the precursor core eventually hinders further reaction by separating the second reactant and the first layer, causing the reaction to effectively stop, leaving a bonding element having the core, the first layer at a periphery of the core and a second layer on the first layer. The resulting bonding element is generally larger in size than the original precursor particle, thereby filling in the surrounding porous regions of the porous solid body and bonding with adjacent materials of the porous solid body. As a result, the method allows for net-shape formation of products having substantially the same shape as but a higher density than the original porous solid body. This is an advantage over traditionally sintering processes that cause shrinkage from mass transport to produce a higher density material than the initial powder compact.

C. Infiltration Medium

The infiltration medium used for transportation into at least a portion of the porous matrix includes a solvent (e.g., water) and a reactive species (e.g., $CO_2$). The solvent can be aqueous or non-aqueous. The solvent can include one or more components. For example, in some embodiments, the solvent can be water and ethanol, ethanol and toluene, or mixtures of various ionic liquids, such as ionic liquids based on alkyl-substituted imidazolium and pyridinium cations, with halide or trihalogenoaluminate anions. Wetting systems are preferred over non-wetting in order to simplify processing equipment.

The solvent should not be chemically reactive with the porous matrix, although the solvent may chemically react with reactive species. The solvent can be removed via a variety of separation methods such as bulk flow, evaporation, sublimation or dissolution with a washing medium, or any other suitable separation method known to one of ordinary skill in the art.

More specifically, the solvent is a liquid at the temperature where the dissolved reactive species react with the porous matrix. This temperature will vary depending on the specific solvent and reactive species chosen. Low temperatures are preferred over higher ones to save energy and simplify processing equipment thereby reducing manufacturing costs.

The role of the solvent contrasts with prior art involving reactive systems, such as, for example, Portland cement, where a solvent such as water reacts with a porous matrix to form products that contain solvent molecules, such as metal hydrates or metal hydroxides, among other precipitation products.

Regardless of the phase of the pure reactive species, the reactive species dissolve in the solvent as neutral, anionic or cationic species. For example, the at least one reactive species can be $CO_2$, which is a gas at room temperature that can dissolve in water as neutral $CO_2$ but can create reactive species such as $H_3O^+$, $HCO_3^-$, $H_2CO_3$ and $CO_3^{2-}$. Regardless of the initial phase of the reactive species and the solvent in the natural state, the infiltration medium is in a liquid phases in the pores (e.g., interstitial spaces) of a porous matrix.

For example, capillary forces can be used to wick the infiltration medium into a porous matrix spontaneously. This type of wetting occurs when the infiltration medium has a very low contact angle (e.g., <90° C.). In this case, the medium can partially fill (partially saturate) or fully fill (saturate) the pores. The infiltration can also take place in such a manner that the some pores are filled while others are empty and/or partially filled. It is also possible that an infiltrated porous matrix with gradients in pore filling or saturation can be later transformed to one that is uniform via capillary flow. In addition, wetting does not spontaneously occur when the contact angle of the infiltration medium is high (e.g., >90°). In such cases, fluids will not infiltrate the porous matrix unless external pressure is applied. This approach has utility when it is desirable to withdraw the infiltration medium by the release of pressure (e.g., a reaction can be initiated or halted by pressure).

When infiltration is done using spontaneous capillary flow in the pores, the bulk flow ceases when the pores are filled (saturated). During HLPS, the reactive species react with the matrix to form one or more products by the various reactions. The at least one reaction species is depleted from inside the pore space and thus need to be replenished during the course of the reaction. When pores are fully saturated with the infiltration medium, the reactive species must be transported from the infiltration medium external to the porous matrix through the matrix pores. In a quiescent fluid, diffusion is the process by which transport takes place. Thus, for some HLPS methods whose reactions inside the pores are fast relative to all other mass transport processes, the reaction becomes limited by large increases in the porous matrix thickness. In such a case, only the outer portion of the matrix reacts extensively with the reactive species, while inner regions of the porous matrix are either less completely reacted or unreacted. These type of reactions are suitable for preparation of gradient microstructures where the concentrations of products of the HLPS process are higher on the outside portion (near external surface regions) versus the interior of the structure.

D. Process Selection and Control

When highly exothermic reactions proceed slowly relative to transport of the infiltration medium and the matrix is thermally insulating, entrapped heat can increase the rate of reaction in the interior of the matrix to enable its interior to contain more product phase (i.e., the product of the reaction between the at least one reactive species and a portion of the porous matrix) than its interior. For HLPS processes where reactions isothermally proceed at an intermediate rate relative to mass transport of the infiltration medium, diffusion can continue to supply the pores with reactive species and no gradient in the degree of reaction (or product concentration) will be observed. In such a case, there is little difference in the chemical and/or phase composition from the interior to the exterior of the material of the monolithic structure or body.

In many cases, a uniform microstructure with respect to phase and composition is desirable in the monolithic structure body. Furthermore, it is also desirable to conduct HLPS reactions in a relatively short time frame, for example, where large thick monolithic bodies are required for applications such as for roads or bridges. It is desirable to balance the rate of reaction and mass transport for HLPS processes. The strategy for precursor choice and method of introducing the precursors to comprise the infiltration medium is important. The preferred choice of precursors and method of introducing the infiltration medium is at least in part a function of the sample thickness in the thinnest direction, the time scale considered acceptable for the process and the thermodynamic and kinetic constraints needed for the process to be commercially viable, such as temperature, pressure and composition.

Table 3 summarizes the precursor choice and method of introduction strategies. The porous matrix can be directly infiltrated or the porous matrix may be evacuated prior to any of the infiltration sequences described in the Table 3. Methods are described that use gases as precursors, liquids as precursors or solids as precursors. In addition, phase mixtures such as solid and liquids, gases and liquids and gas and solids can all be used. For example, a reactant such as $CO_2$ is a gas in its pure state but is converted to a solution species dissolved into water. Such an event can come about by gaseous diffusion into the porous matrix and subsequent condensation when a pore is encountered. This type of precursor system is relevant when microstructures having carbonate phases are desired. The order of addition of the precursors (solvent and reactive species) can influence the reaction yield and microstructure of the material.

TABLE 3

Precursors and Methods of Introduction for HLPS Processes

| System | Reactive Species | Solvent | Deliquescent Material | Methods of Introduction |
|---|---|---|---|---|
| (1) | Gas | Gas | | Premixing (parallel introduction) two gases and introducing them to a lower temperature to condense one or more gas species in the matrix to comprise an infiltrating solution containing reactive species and solvent or condense the gas mixture in the matrix by cooling the matrix or utilize a porous matrix that possesses Kelvin pores to condense the gas phase in the matrix. Gases can also be introduced in series where one gas is condensed prior to infiltration or after infiltration and the other is introduced afterwards to dissolve in the liquid phase. The reverse order is possible but the reaction yield could be reduced. |
| (2) | Gas | Gas | Solid | Pre-mixing deliquescent solid with matrix, pre-mix gases (parallel introduction) then flow and/or diffuse the gas mixture through the matrix to form infiltrating solution<br>Gases can be introduced in series into the deliquescent solid-matrix pre-mixture. The preferred order is to have the gas that liquefies the deliquescent solid and then the gas that dissolves to form reactive species. The reverse order is acceptable but the reaction yield could be reduced |
| (3) | Gas | Liquid | Solid | Premixing of deliquescent solid with matrix, then infiltrate with liquid solvent, then add gas (or visa-versa) to form infiltrating solution in matrix pores. Reverse order of gas and liquid is possible but may result in reduced reaction yield<br>or<br>Gas and liquid could be pre-mixed as a solution for introduction into the deliquescent solid-matrix pre-mixture but reaction yield might be reduced |
| (4) | Liquid | Liquid | | Pre-mix (parallel introduction) fluids then infiltrate matrix.<br>or<br>Infiltrate fluids through matrix in series with preferred ordering being liquid solvent prior to liquid that provides reactive species. |
| (5) | Liquid | Liquid | Solid | Premixing of deliquescent solid with matrix, then add liquid solvent to dissolve deliquescent solid, then add liquid reactive species (or visa-versa) to form infiltrating solution.<br>or<br>Pre-mixed solvent and reactive species in liquid phases as an infiltration solution for introduction into the deliquescent solid-matrix pre-mixture |
| (6) | Liquid | Gas | | Infiltrate matrix with gas and condense in matrix as liquid, then infiltrate second liquid into matrix to mix with first liquid in matrix. Reverse order is also possible but not preferred due to possibility of low reaction yield.<br>or<br>Preferred route is premixing of gas and liquid by condensing gas and mixing into second liquid, then introduce solution to a porous matrix |
| (7) | Gas | Liquid | — | Infiltrate liquid then introduce gas or<br>Pre-dissolve gas in liquid then infiltrate |
| (8) | Solid | Solid | | Mix solids with porous matrix, then pressurize or heat to form infiltration liquid. One solid may flux the other to form a liquid phase that can be removed later by washing. Other solids could be added to reduce melting temperature to form liquid phase as long as it can be removed later |
| (9) | Liquid | Solid | | Prepare infiltration solution by dissolving solid in liquid, then infiltrate<br>Or<br>Premix solid with porous matrix, then infiltrate with liquid |

TABLE 3-continued

Precursors and Methods of Introduction for HLPS Processes

| System | Reactive Species | Solvent | Deliquescent Material | Methods of Introduction |
|---|---|---|---|---|
| (10) | Solid | Liquid | | Prepare infiltration solution by dissolving solid in liquid, then infiltrate<br>Or<br>Premix solid with porous matrix, then infiltrate with liquid |

In some embodiments, the solvent and reactive species may be premixed to form the infiltration medium and then introduced into the matrix in a single step. In other embodiments, it may be preferable to employ multiple infiltration sequences. For example, the solvent precursor could be introduced first followed by infiltration of the reactive species or vice versa.

Neither the solvent nor the reactive species precursors need to be the same phase initially as the infiltrating medium will be a liquid that is found in the pores of the matrix. For example, the solvent precursor can be a vapor such as water, which is gaseous at temperatures at 100° C. or higher at atmospheric pressure and can be condensed to a liquid by cooling the matrix to a temperature lower than 100° C. or utilizing surface energy by using porous matrices with pore sizes in the Kelvin pore-size range (less than 100 nm). When the pores are large, the temperature is elevated such that gaseous species cannot be thermally condensed, small amounts of infiltrating solution are needed or other reasons not discussed here, and it may be desirable to form the liquid in the pore using a deliquescent compound. Examples of such compounds include boric acid, iron nitrate, and potassium hydroxide. In this case, a vapor such as water can convert the deliquescent solid phase in the pore to a liquid and crystal growth of the product phase can proceed in the pore. This is particularly useful when liquid infiltration and diffusion limits the thickness of the product made by HLPS. Alternatively, gaseous diffusion can be used to transport species over much large distances to form the infiltration medium required for HLPS inside of the pores of the matrix.

Various additives can be incorporated to improve the HLPS process and the resulting products. Additives can be solids, liquids or gases in their pure state but either soluble in the solvent phase or co-processed (e.g., pre-mixed) with the porous matrix prior to incorporation of the infiltration medium. Examples include nucleation catalysts, nucleation inhibition agents, solvent conditioners (e.g., water softening agents), wetting agents, non-wetting agents, cement or concrete additives, additives for building materials, crystal morphology control additives, crystal growth catalysts, additives that slow down crystal growth, pH buffers, ionic strength adjusters, dispersants, binders, rheological control agents, reaction rate catalysts, electrostatic, steric, electrosteric, polyelectrolyte and Vold-layer dispersants, capping agents, coupling agents and other surface-adsorptive species, acid or base pH modifiers, additives generating gas, liquids or solids (e.g., when heated, pressurized, depressurized, reacted with another species or exposed to any processing variable no listed here), and biological or synthetic components (e.g., serving any of the above functions and/or as a solvent, reactive species or porous matrix).

In some embodiments, a deliquescent solid may be used. The deliquescent solid may be premixed with the porous matrix. Then pre-mixture of the solvent and at least one reactive species can be introduced to the deliquescent solid-porous matrix. The solvent and at least one reactive species in the pre-mixture can be both in the gaseous phase or both in liquid phases. In some embodiments, the solvent may be a liquid and the at least one reactive species may be in a gaseous phase in the pre-mixture or vice versa.

A gas-water vapor stream can be passed over a deliquescent salt in the porous matrix to generate the infiltrating medium in a liquid phase in the interstitial space in the porous matrix. For example, a humid gas-water vapor stream can serve as a solvent for $CO_2$ dissolution and ionization. A large number of salts are known to be deliquescent and can be used suitable for forming liquid solutions from the flow of humid air over the salt surfaces. Selection of the appropriate salt relies on the level of humidity in the air. Some salts can operate at very low relative humidities. Examples of deliquescent slats include $Mg(NO_3)_2$, $CaCl_2$ and NaCl.

Regarding delivery of the infiltration medium, it can be delivered as a bulk solution that spontaneously wets the porous matrix. There are many options for delivery of this solution. First, the porous matrix can be immersed in the liquid. Second the infiltration solution can be sprayed onto the porous matrix. In a quiescent system, when there is a volume of infiltration solution that is greater than the pore volume of the porous matrix, diffusion propagates the reaction by delivering the reactive species to the pore sites.

Alternatively, the fluid can flow (mechanically convected) through the porous matrix by a variety of methods. Methods such as pressurized flow, drying, electro-osmotic flow, magneto-osmosis flow, and temperature- and chemical-gradient-driven flow can be used to flow the liquid infiltration medium through the porous body. This dynamic flow allows fresh reactant to be near the porous matrix, as opposed to relying on diffusional processes. This approach is beneficial as long as the pore size distribution of the matrix permits a reasonably high flow rate of a fluid that supplies reactive species faster than a diffusional process and is optimal when the supply rate equals or exceeds the reaction rate for product formation. In addition, flow-through of the infiltration medium is especially useful for highly exothermic reactions. This is particularly beneficial for monolithic structures that are thick and can generate heat internally capable of generating internal pressures capable of fracturing the monolithic structure.

There are many applications where thicknesses of materials exceed this length scale. In these cases, mechanical convection of the fluid by any suitable means known to one of skill in the art is preferred. An alternative is to introduce the solvent or reactive species as a gaseous species. Also, supercritical conditions can be employed to achieve transport rates that lie between liquids and gases. Gas species may be mechanically convected by applying a pressure gradient across the porous matrix. If the gas is a reactive species, pores filled with solvent fluid can flow out of the pores leaving behind a film of solvent on the pores that can absorb the reactive species gas. Alternatively, partially filled pores will allow gas to flow through the pores as the solvent absorbs a portion of the gas flowing through.

A system may utilize low temperatures and low pressures to enable a low cost process. Thus, processes that retain a fraction of solvent in the pores to facilitate gaseous diffusion of reactive species are preferred over those that utilize quiescent fluids for reactions where a large fraction of product is desired. There are many apparatus designs that can effectively transport reactant and solvent species to the pores. Some of these designs involve conventional reactor equipment such as filter presses, spray chambers, autoclaves and steamers.

EXAMPLES

Example 1

Pavers with Construction Sand (6"×9")

Raw Materials

Synthetic Wollastonite (SC-C2), Donghai Golden Resources Industries, Donghai, China; ¼" trap rock aggregate from Stavola (NJ), construction sand from Bound Brook (NJ) and Glenium 7500 (BASF). Table 4 gives the mixture proportion of the raw material used to prepare the pavers.

TABLE 4

| Mixing Proportions (100 kg batch size) | | |
|---|---|---|
| Solid Components: | 94.3% | |
| Synthetic Wollastonite (SC-C2) | 18% | 17.1 kg |
| Construction sand | 55.2% | 52.2 kg |
| ¼" aggregate | 26.8% | 25 kg |
| Liquid Components: | 5.7% | |
| Tap Water | 98.81% | 5.632 kg |
| Glenium 7500 | 1.19% | 0.068 kg |

Mixing Procedure
1. Measure and load 25 kg of ¼" aggregate into a planetary mixer (Sicoma™ MP375/250).
2. Measure and load 55.2 kg of construction sand into the mixer.
3. Measure and load 17.1 kg of Synthetic Wollastonite (SC-C2) mixer.
4. Mix the solid components loaded into the mixer for approximately 3 minutes. This creates a dry mixture.
5. Measure and load the liquid component (5.632 kg of water and 0.068 kg of Glenium 7500 as in this example) into the mixer containing the dry mixture, and continue mixing for approximately for 2 minutes until uniform slurry is formed. This creates a wet mixture.

Pressing Procedure
1. The wet mixture is discharged into a hopper and conveyed to the paver forming machine (Columbia Model 1600)
2. The wet mixture is then discharged into the feed hopper of the paver forming machine
3. The wet mixture is then discharged from the feed hopper into the paver mold cavity. As the wet mixture is discharged into the paver mold cavity, the mold is vibrated so as to effectively fill the cavity.
4. The compression head of the paver press compresses the wet mixture for approximately 1.5 seconds or until the wet mixture reaches a height of 2⅝" inch. This creates a green ceramic body.
5. The green ceramic body is then stripped from the mold cavity.

Curing Procedure

The green ceramic body was placed inside a 7 ft diameter, 12 ft long, horizontal, curing chamber. The curing chamber was purged with $CO_2$ gas for 12 minutes. The temperature of the curing chamber was then set to 60° C. and hot water at 70° C. was circulated at the bottom of the curing chamber to keep the chamber saturated with water vapor. During the $CO_2$ purge, a fan stirred the atmosphere within the curing chamber. Once the atmosphere within the curing chamber reaches 60° C., the gas concentrations are approximately 84% $CO_2$ and 16% $H_2O$ vapor. In general an atmosphere comprising approximately 50% or more $CO_2$ is advantageous. In a preferred embodiment, an atmosphere comprising approximately 80% or more $CO_2$ is used.

The green ceramic body was cured under these conditions for 19 hours. The cured ceramic body was removed from the curing chamber and placed in an industrial dying oven at 90° C. to remove any residual water. The extent of the reaction was calculated based on the weight gain during the reaction. The cured ceramic bodies exhibited an extent of reaction of at least 50%.

Figure 3:
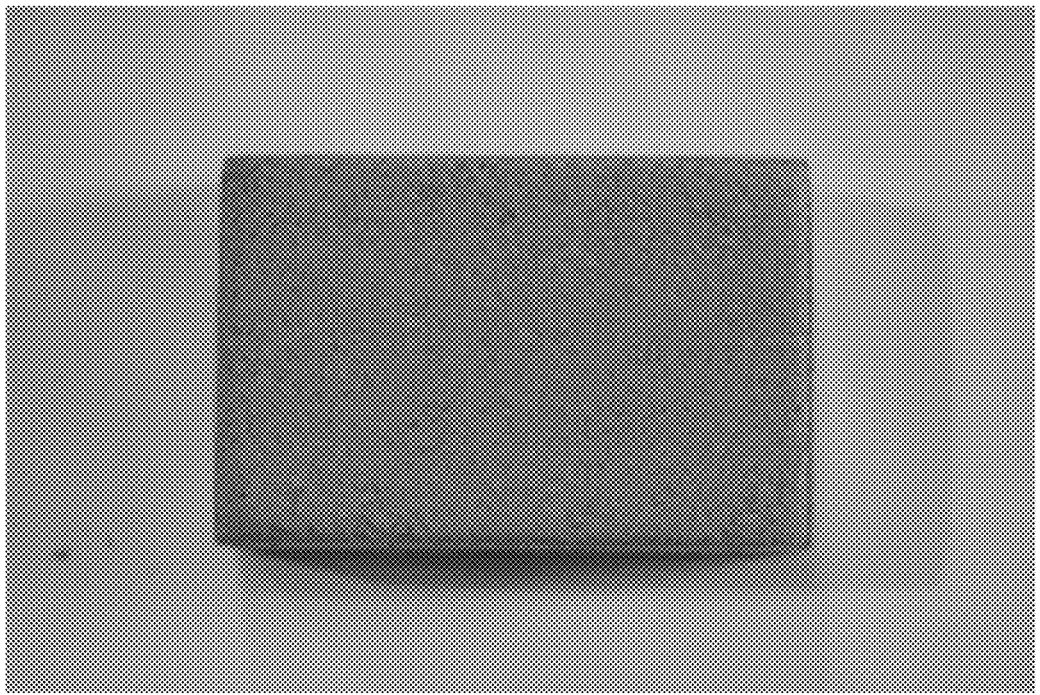
FIG. 3 is an image of a 6"×9" paver made according to an embodiment of the present invention.

FIG. 3 is an image of a 6"×9" cured ceramic body in the form of a paver made according to an embodiment of the present invention.

Testing

Compressive strength of the cured ceramic body in the form of the paver was measured as per ASTM C 936 using a Gilson universal testing machine at an average rate between 50 and 100 psi/second. Six pavers were tested for compressive strength. The average compressive strength was 67.6 MPa (9,804 psi) with a standard deviation of 4 MPa (600 psi).

Example 2

Colored Pavers

This example specifies the formulation of pavers made with pigments to colored pavers. In this example Red colored pavers were made. Table 5 shows the mixing proportion of the raw materials used for preparing these red colored pavers. These pavers had a minimum compressive strength of 55.2 MPa (8000 psi) as per ASTM C 936.

TABLE 5

| Mixing Proportions (100 kg batch size) | | |
|---|---|---|
| Solid Components: | 94.3% | |
| Synthetic Wollastonite (SC-C2) | 18% | 17.1 kg |
| Construction sand | 55.2% | 52.2 kg |
| ¼" Aggregate | 26.4% | 24.89 kg |
| Pigment (Red Iron oxide) | 0.4% | 0.11 kg |
| Liquid Components: | 5.7% | |
| Tap Water | 98.81% | 5.632 kg |
| Glenium 7500 | 1.19% | 0.068 kg |

Advantages of Pavers of this Invention Over Pavers Made with Portland Cement

Pavers described herein exhibited a lower standard deviation in compressive strength performance compared to industrial pavers; a higher compressive strength obtained than standard requirement, which gives the potential to reduce the binder content; the ability to re-utilize the concrete mix without wastage after an improper press (because the Solidia mix does not cure in the absence of carbon dioxide); an absence of alkali after reaction/curing eliminates primary efflorescence or leaching out of alkalis (efflorescence is one of the biggest issues Portland cement paver manufacturers face); a reduced pigment requirement due to the lighter shade of Solidia Binder and Reaction product; and a lower water demand (because of improved packing with reduced water in the mix).

Example 3

Blocks with Construction Sand

Raw Materials

Synthetic Wollastonite (SC-C2), Donghai Golden Resources Industries, Donghai, China; ¼" trap rock aggregate from Stavola (NJ), construction sand from Bound Brook (NJ) and Glenium 7500 (BASF). Table 6 shows the mixing proportion of the raw material used for this example.

TABLE 6

| Mixing Proportions (100 kg batch size) | | |
|---|---|---|
| Solid Components: | 93.9% | |
| Synthetic Wollastonite (SC-C2) | 18% | 16.902 kg |
| Construction Sand | 55.2% | 51.832 kg |
| ¼" Aggregate | 26.8% | 25.165 kg |
| Liquid Components: | 6.1% | |
| Tap Water | 98.81% | 6.02 kg |
| Glenium 7500 | 1.19% | 0.08 kg |

Mixing Procedure

The mixing procedure is similar to the procedure adopted for pavers to prepare the wet mixture.

Pressing Procedure

Similar procedure was used to press blocks as mentioned in the examples for pavers with the exception of the mold geometry. To form a green ceramic body as a precursor to a block the mold had the dimension of the 7⅝"×7⅝"×15⅝" (49% of volume being solid).

Curing Procedure

The green ceramic body was cured similar to the procedure mentioned in Example 1 to create a cured ceramic body in the form of a block.

Testing

The cured ceramic body in form of block was tested for compressive strength as per ASTM C90. The compressive strength of the blocks prepared was 36.6 MPa (5300 psi).

Figure 4:
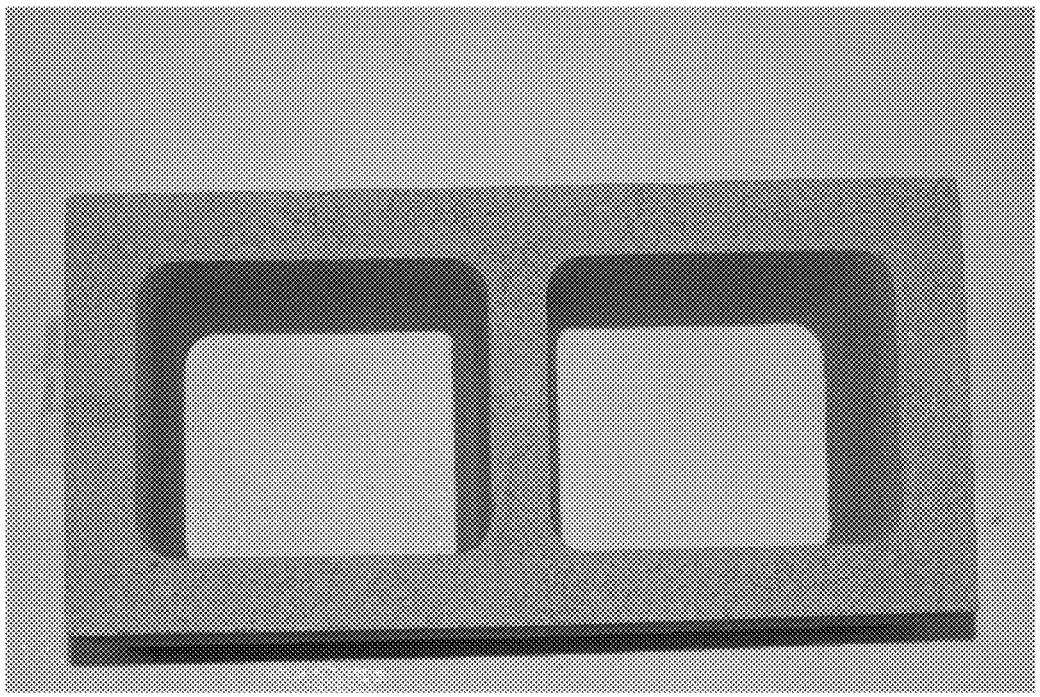
FIG. 4 is an image of a block made according to an embodiment of the present invention.

FIG. 4 is an image of a cured ceramic body in the form of a block made according to an embodiment of the present invention.

Advantages of Blocks in this Invention as Compared to Blocks Made with Portland Cement In addition to the advantages listed above for Solidia pavers, Solidia block have improved thermal resistance compared to that of Portland cement blocks, and have improved fire resistance.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A composite construction material, comprising:
a plurality of bonding elements, wherein each bonding element comprises:
a core comprising primarily calcium silicate,
a silica-rich first or inner layer, and
a calcium carbonate-rich second or outer layer; and
a plurality of filler particles,
wherein the plurality of bonding elements and the plurality of filler particles together form one or more bonding matrices and the bonding elements and the filler particles are configured to be bonded together as a result of a reaction in which an atmosphere comprising more than 50% carbon dioxide is present for about 1 hour to about 80 hours, wherein the composite construction material has a compressive strength in the range of 50 MPa to 300 MPa.

2. The composite construction material of claim 1, wherein the bonding elements and the filler particles are configured to be bonded together as a result of a reaction in which an atmosphere comprising more than 80% carbon dioxide is present.

3. The composite construction material of claim 1, further comprising a colorant.

4. The composite construction material of claim 1, wherein the plurality of bonding elements have a median particle size in the range from about 5 μm to about 100 μm.

5. The composite construction material of claim 1, wherein the filler particles are made from a silicon dioxide-rich material.

6. The composite of claim 1, wherein the plurality of filler particles comprise one or more of quartz, mica and feldspar.

7. The composite construction material of claim 1, wherein the plurality of bonding elements are chemically transformed from ground wollastonite.

8. The composite construction material of claim 1, wherein the plurality of bonding elements are chemically transformed from a precursor calcium silicate other than wollastonite.

9. The composite construction material of claim 1, wherein the plurality of bonding elements are chemically transformed from a precursor calcium silicate comprising one or more of aluminum, magnesium and iron.

10. The composite construction material of claim 3, wherein the colorant comprises one or more of iron oxide, cobalt oxide and chromium oxide.

11. The composite construction material of claim 1, wherein the weight ratio of bonding elements:filler particles is about 8-50:50-92.

12. The composite construction material of claim 3, wherein the colorant is present in an amount up to about 10% by weight.

13. The composite construction material of claim 1, wherein the plurality of bonding elements are prepared by chemical transformation from ground wollastonite by reacting it with $CO_2$ via a controlled hydrothermal liquid phase sintering process.

14. The composite construction material of claim 1, wherein the plurality of bonding elements are prepared by chemical transformation from the precursor calcium silicate other than wollastonite by reacting it with $CO_2$ via a controlled hydrothermal liquid phase sintering process.

15. The composite construction material of claim 1, having water absorption of less than about 10%.

16. The composite construction material of claim 1, exhibiting a visual pattern similar to stone.

17. The composite construction material of claim 1, wherein the weight ratio of bonding elements:filler particles is about 5-50:50-95.

18. The composite construction material of claim 1, wherein the bonding elements and the filler particles are configured to be bonded together as a result of a reaction in which an atmosphere comprising more than 50% carbon dioxide is present for about 5 hours to about 70 hours.

19. The composite construction material of claim 1, having a flexural strength of 5 MPa to 30 MPa.

20. The composite construction material of claim 1, wherein the plurality of bonding elements and the filler particles are configured to be bonded together as a result of a reaction at a temperature in the range from about 60° C. to about 110° C. for about 15 hours to about 70 hours under an atmosphere of water and $CO_2$ having a pressure in the range from ambient atmospheric pressure to about 30 psi.

21. The composite construction material of claim 1, wherein the plurality of bonding elements are chemically transformed from ground wollastonite having a median particle size from about 5 μm to about 50 μm, a bulk density from about 0.6 g/ml to about 0.8 g/ml (loose) and about 1.0 g/ml to about 1.2 g/ml (tapped), and a surface area from about 1.5 m²/g to about 2.0 m²/g.

22. The composite construction material of claim 21, wherein the filler particles comprise an $SiO_2$-based material having a median particle size of 5 μm to 7 mm.

* * * * *